(12) United States Patent
Fujita (10) Patent No.: US 9,578,190 B2
(45) Date of Patent: Feb. 21, 2017

(54) COMMUNICATION APPARATUS, CONTROL METHOD AND RECORDING MEDIUM

(71) Applicant: CANON KABUSHIKI KAISHA, Tokyo (JP)

(72) Inventor: Shunji Fujita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/149,203

(22) Filed: Jan. 7, 2014

(65) Prior Publication Data

US 2014/0204224 A1 Jul. 24, 2014

(30) Foreign Application Priority Data

Jan. 18, 2013 (JP) ................................. 2013-007843

(51) Int. Cl.
*H04N 1/00* (2006.01)
*H04W 12/06* (2009.01)
(Continued)

(52) U.S. Cl.
CPC ....... *H04N 1/00315* (2013.01); *H04N 1/0045* (2013.01); *H04N 1/00307* (2013.01); *H04N 1/00411* (2013.01); *H04N 1/00427* (2013.01); *H04W 12/06* (2013.01); *H04N 2201/0055* (2013.01); *H04N 2201/0075* (2013.01); *H04N 2201/0084* (2013.01); *H04N 2201/325* (2013.01); *H04N 2201/3226*
(Continued)

(58) Field of Classification Search
CPC ........ H04N 48/00; H04N 72/00; H04N 88/00; H04N 1/00315; H04N 1/00427;
(Continued)

(56) References Cited

U.S. PATENT DOCUMENTS 8,036,721 B1 * 10/2011 Rainnie ............. H04W 52/0277
455/127.1
9,137,620 B1 * 9/2015 Mirza ..................... H04W 4/00
(Continued)

FOREIGN PATENT DOCUMENTS

CN 202206463 U 4/2012
JP 2006-186941 A 7/2006
(Continued)

OTHER PUBLICATIONS

The above foreign patent documents were cited in a Aug. 19, 2016 Chinese Office Action, which is enclosed with an English Translation, that issued in Chinese Patent Application No. 201410023518.7.

(Continued)

*Primary Examiner* — Mekonnen Dagnew
(74) *Attorney, Agent, or Firm* — Cowan, Liebowitz & Latman, P.C.

(57) ABSTRACT

A communication apparatus generates a first wireless communication network and transmits/receives information via the first wireless communication network. The communication apparatus generates a second wireless communication network different from the first access point and transmits/receives information via the second wireless communication network. The communication apparatus controls to change a function available by using a predetermined application in accordance with the first or second wireless network via which an external device establishing communication is connected.

17 Claims, 5 Drawing Sheets

(51) Int. Cl.
    *H04W 12/08*        (2009.01)
    *H04W 84/12*        (2009.01)
(52) U.S. Cl.
    CPC ......... (2013.01); *H04N 2201/3273* (2013.01); *H04W 12/08* (2013.01); *H04W 84/12* (2013.01)
(58) Field of Classification Search
    CPC ........... H04N 1/00411; H04N 1/00307; H04N 1/0045; H04N 2201/0084; H04N 2201/0075; H04N 2201/325; H04N 2201/0055; H04N 2201/3226; H04N 2201/3273; H04W 12/06; H04W 12/08; H04W 12/02
    USPC .......................... 348/207.1, 207.99; 725/105
    See application file for complete search history.

(56) References Cited

U.S. PATENT DOCUMENTS

| 2004/0009778 | A1  | 1/2004  | Makuta |
| 2010/0061336 | A1* | 3/2010  | Kim ................... H04W 36/005 370/331 |
| 2010/0182959 | A1  | 7/2010  | Cook et al. |
| 2011/0069188 | A1* | 3/2011  | Singh et al. ............. 348/207.11 |
| 2011/0176417 | A1* | 7/2011  | Kuwabara ............. H04W 36/22 370/230 |
| 2013/0002891 | A1  | 1/2013  | Singh et al. |
| 2013/0122882 | A1* | 5/2013  | Patel et al. ..................... 455/418 |
| 2013/0137423 | A1* | 5/2013  | Das ....................... H04W 12/08 455/426.1 |
| 2014/0195654 | A1* | 7/2014  | Kiukkonen ............. H04W 8/00 709/220 |

FOREIGN PATENT DOCUMENTS

| JP | 2009-182564 A | 8/2009 |
| JP | 2011-120279 A | 6/2011 |

OTHER PUBLICATIONS

Nov. 7, 2016 Japanese Office Action, which is enclosed without an English Translation, that issued in Japanese Patent Application No. 2013-007843.

* cited by examiner

FIG. 3

| SSID | MAC ADDRESS |
|---|---|
| MY_SSID | 00:11:22:33:44:55 |
| GUEST_SSID | 66:77:88:99:AA:BB |
| GUEST_SSID | CC:DD:EE:FF:00:11 |

FIG. 4A

| FRAME CONTROL | DURATION/ ID | DESTINA- TION ADDRESS | SOURCE ADDRESS | BSSID | SEQUENCE CONTROL | CAPABILITY INFORMA- TION | LISTEN INTERVAL | SERVICE SET ID | SUPPORTED RATES | FCS |

FIG. 4B

| FRAME CONTROL | DURATION/ ID | DESTINA- TION ADDRESS | SOURCE ADDRESS | BSSID | SEQUENCE CONTROL | BODY | FCS |

| SSID | EXTERNAL CONTROL PERMISSION SETTING | | | |
|---|---|---|---|---|
| | CAPTURING | IMAGE BROWSING | IMAGE EDITING | SETTING CHANGE |
| MY_SSID | PERMIT | PERMIT | PERMIT | PERMIT |
| GUEST_SSID | PERMIT | PERMIT | INHIBIT | INHIBIT |

COMMUNICATION APPARATUS, CONTROL METHOD AND RECORDING MEDIUM

BACKGROUND OF THE INVENTION

Field of the Invention

The present invention relates to a communication apparatus, control method and recording medium, and particularly to a communication apparatus which operates as an access point of wireless communication.

Description of the Related Art

Some image capturing apparatuses such as a digital camera have a wireless communication function and transfer captured still images, moving images, and the like to an external device via a wireless communication network (Japanese Patent Laid-Open No. 2011-120279). Such an image capturing apparatus operates as a station in a wireless communication network and is connected to an external device via an access point.

Further, some recent image capturing apparatuses operate as access points by themselves and enable wireless connection to a plurality of external devices. There is also an image capturing apparatus which operates as an access point by attaching a memory card operating as an access point, such as an Eye-Fi® card, to the image capturing apparatus. An image capturing apparatus operating as an access point can provide functions such as image browsing to a plurality of wirelessly connected external devices.

However, when an image capturing apparatus operates as an access point, functions to be provided to an external device need to be limited for each device. For example, when the image capturing apparatus provides functions such as image browsing, editing, and deletion, the owner of the image capturing apparatus may not want to provide functions such as editing and deletion to the devices of other users.

To prevent this, whether to provide functions may be set in advance for each device in accordance with device identifier information such as a MAC address, thereby limiting functions to be provided to an external device. However, in this method, the owner of the image capturing apparatus needs to acquire in advance device identifier information of an external device to be connected, and preliminarily set functions to be provided for each device. This may impose a complicated operation on the owner.

SUMMARY OF THE INVENTION

The present invention was made in view of such problems in the conventional technique. The present invention provides a communication apparatus capable of easily setting functions to be provided to an external device, a control method and a recording medium.

The present invention in its first aspect provides a communication apparatus capable of operating as a generator of a plurality of wireless networks, comprising: a first communication unit configured to generate a first wireless network and transmit/receive information via the first wireless network; a second communication unit configured to generate a second wireless network different from the first wireless network and transmit/receive information via the second wireless network; a determination unit configured to determine one of the first wireless network and the second wireless network via which an external device establishing communication with the communication apparatus is connected; and a control unit configured to control to allow the external device to use a function using a predetermined application, wherein the control unit controls to change a function available by using the predetermined application in accordance with a result of determination by the determination unit.

The present invention in its second aspect provides a method of controlling a communication apparatus capable of operating as a generator of a plurality of wireless networks, the communication apparatus including a first communication unit configured to generate a first wireless network and transmit/receive information via the first wireless network, and a second communication unit configured to generate a second wireless network different from the first wireless network and transmit/receive information via the second wireless network, the control method comprising: determining one of the first wireless network and the second wireless network via which an external device establishing communication with the communication apparatus is connected; and controlling to allow the external device to use a function using a predetermined application, wherein the controlling is performed to change a function available by using the predetermined application in accordance with a result of the determination.

Further features of the present invention will become apparent from the following description of exemplary embodiments (with reference to the attached drawings).

DESCRIPTION OF THE EMBODIMENTS

An exemplary embodiment of the present invention will now be described in detail with reference to the accompanying drawings. The following embodiment will explain an example in which the present invention is applied to, as an example of a communication apparatus, a digital camera having the wireless communication function and capable of operating as an access point (to be referred to as an AP hereinafter). However, the present invention is applicable to an arbitrary device capable of operating as an AP. Also, the embodiment will exemplify, as an external device, a mobile phone which has the wireless communication function and operates as a station (to be referred to as a STA hereinafter) that is connected to an access point and performs communication. However, the external device is not limited to this.

Arrangements of Digital Camera 100 and Mobile Phone 200

Figure 1:
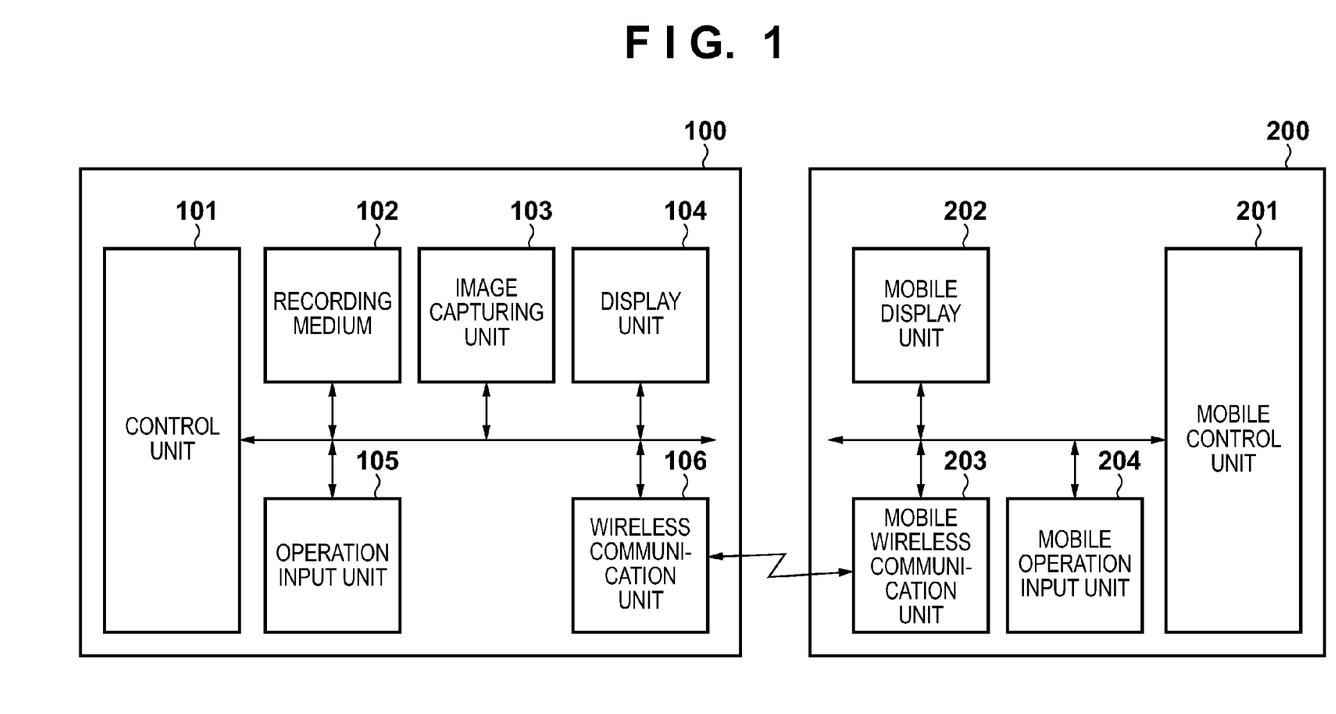
FIG. 1 is a block diagram showing the functional arrangements of a digital camera 100 and mobile phone 200 according to an embodiment of the present invention.

FIG. 1 is a block diagram showing the functional arrangements of a digital camera 100 and mobile phone 200 according to the embodiment of the present invention.

Arrangement of Digital Camera 100

A control unit 101 is, for example, a CPU. The control unit 101 controls the operation of each block of the digital camera 100. More specifically, the control unit 101 reads out the operation program of each block that is stored in a ROM (not shown), loads it to a RAM (not shown), and executes it to control the operation of the block.

A recording medium 102 is, for example, a storage device incorporated in a built-in memory, or a storage device such as a memory card or HDD detachably connected to the digital camera 100. In the embodiment, data of a still image or moving image (to be simply referred to as image data hereinafter) output from an image capturing unit 103 upon capturing is recorded on the recording medium 102.

The image capturing unit 103 is an image sensor such as a CCD or CMOS sensor. The image capturing unit 103 generates an analog image signal by photo-electrically converting an optical image formed on the image sensor surface via an optical system (not shown). In addition, the image capturing unit 103 applies signal processing for recording, including A/D conversion processing, to the generated analog image signal, and records the resultant signal as image data on the recording medium 102.

A display unit 104 is a display device such as an LCD in the digital camera 100. The display unit 104 displays an image signal obtained by the image capturing unit 103 or an image signal corresponding to image data read out from the recording medium 102.

An operation input unit 105 is a user interface including, for example, a power button and touch panel sensor in the digital camera 100. When the operation input unit 105 detects that an operation input has been performed, it transmits a corresponding control signal to the control unit 101.

A wireless communication unit 106 is a wireless communication interface in the digital camera 100. The wireless communication unit 106 includes dedicated hardware such as an antenna necessary to generate a wireless communication network. In the embodiment, the wireless communication unit 106 is assumed to perform wireless LAN communication complying with IEEE802.11n/a/g/b. The wireless communication unit 106 operates as an AP and generates a wireless communication network. In the embodiment, the wireless communication unit 106 can generate two wireless communication networks. While operating as an AP in one wireless communication network, the wireless communication unit 106 can also operate as an AP in the other wireless communication network. That is, the wireless communication unit 106 can simultaneously operate as two types of APs having different SSIDs (Service Set ID) (identification names). Assume that various kinds of setting information such as the SSID used when the wireless communication unit 106 operates as an AP are stored in a built-in memory in the wireless communication unit 106, a ROM (not shown), or the like. The two generated wireless communication networks are examples of wireless communication networks which perform the first communication and second communication, respectively.

Arrangement of Mobile Phone 200

A mobile control unit 201 is, for example, a CPU. The mobile control unit 201 controls the operation of each block of the mobile phone 200. More specifically, the mobile control unit 201 reads out the operation program of each block that is stored in a mobile ROM (not shown), loads it to a mobile RAM (not shown), and executes it to control the operation of the block.

A mobile display unit 202 is a display device such as an LCD in the mobile phone 200. In the embodiment, the mobile display unit 202 displays, for example, the GUI of an application executed in the mobile phone 200.

A mobile wireless communication unit 203 is a wireless communication interface in the mobile phone 200. The mobile wireless communication unit 203 includes dedicated hardware such as an antenna necessary for connection to a wireless communication network. In the embodiment, the mobile wireless communication unit 203 is assumed to perform wireless LAN communication complying with IEEE802.11n/a/g/b so that it can communicate with the wireless communication unit 106 of the digital camera 100. The mobile wireless communication unit 203 operates as a STA and is wirelessly connected to the digital camera 100 serving as an AP in the infrastructure mode.

A mobile operation input unit 204 is a user interface including, for example, a home button and touch panel sensor in the mobile phone 200. When the mobile wireless communication unit 203 detects that an operation input has been performed, it transmits a corresponding control signal to the mobile control unit 201.

Assume that the digital camera 100 according to the embodiment functions as a Web server when it operates as an AP. When the mobile phone 200 is wirelessly connected as an STA to the digital camera 100, it can access the Web server by executing a dedicated client program. More specifically, by executing the client program, the mobile phone 200 can access the Web server in accordance with IP address information registered in advance. At this time, assume that the client program has a Web browsing function and data access is performed using HTTP (HyperText Transfer Protocol). Note that the protocol used for data access is not limited to this, and DLNA (Digital Living Network Alliance) or the like is also usable.

Connection Device Management Processing

Figure 2:
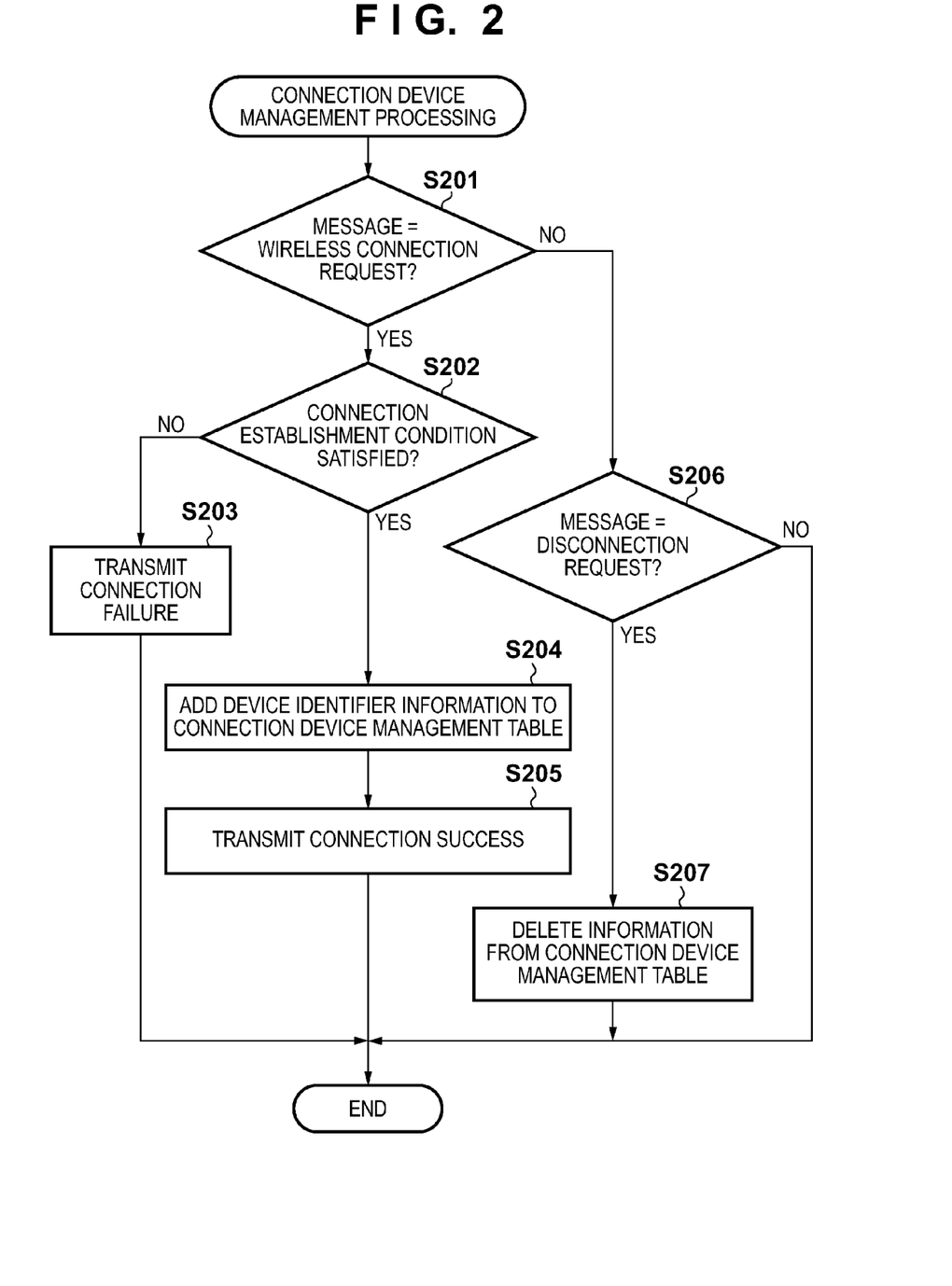
FIG. 2 is a flowchart exemplifying connection device management processing to be executed by the digital camera 100 according to the embodiment of the present invention.

Connection device management processing which is executed by the digital camera 100 according to the embodiment having the above-described arrangement to register and manage an AP to be connected for each external device to be wirelessly connected will be explained in detail with reference to the flowchart of FIG. 2. Processing corresponding to this flowchart can be implemented by reading out a corresponding processing program stored in, for example, the ROM, loading it to the RAM, and executing it by the control unit 101. In the following description, the connection device management processing starts when, for example, the wireless communication unit 106 receives a message from an external device while the digital camera 100 operates as a predetermined AP.

In step S201, the control unit 101 determines whether the message received by the wireless communication unit 106 is an association request serving as a wireless connection request from the external device. If the control unit 101 determines that the received message is the association request, it shifts the process to step S202. If the control unit 101 determines that the received message is a message other than the association request, it shifts the process to step S206.

In step S202, the control unit 101 determines whether the received association request satisfies a connection establishment condition. Assume that the wireless communication unit 106 according to the embodiment can set a connection establishment condition for each AP, like conventional MAC address filtering. If the control unit 101 determines that the received association request satisfies the connection establishment condition, it shifts the process to step S204. If the control unit 101 determines that the received association request does not satisfy the connection establishment condition, it shifts the process to step S203 and transmits, to the external device serving as the request transmitting source, an association response representing that the connection has failed.

Figure 3:
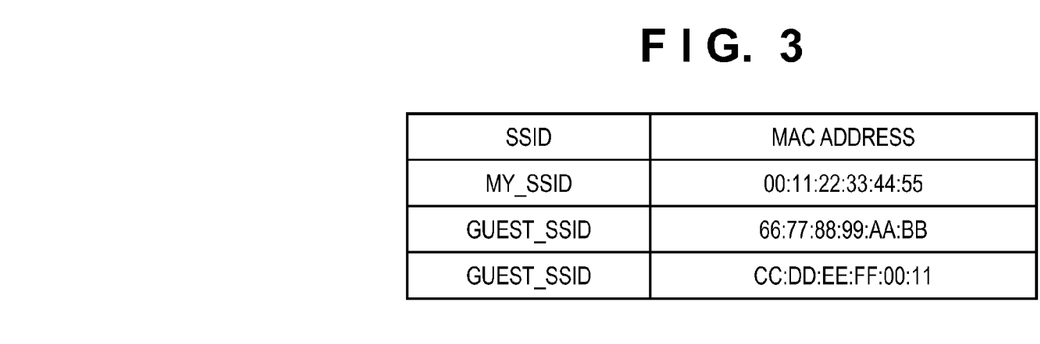
FIG. 3 is a table exemplifying a connection device management table used in the connection device management processing according to the embodiment of the present invention.
Figure 4A:
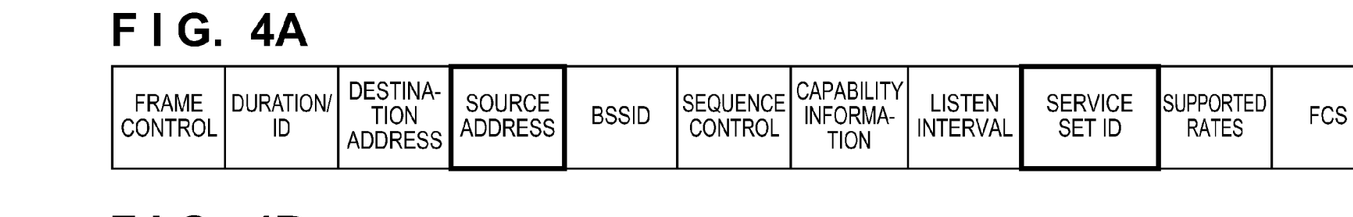
FIGS. 4A and 4B are views for explaining the structure of a message (request) received by the digital camera 100 from an external device according to the embodiment of the present invention.

In step S204, the control unit 101 adds, to a connection device management table stored in, for example, the RAM, device identifier information for specifying the external device serving as the request transmitting source, and identifier information (identification name) of the AP which has received the connection request. These pieces of information are contained in the received association request. In the digital camera 100 according to the embodiment, an external device wirelessly connected to the digital camera 100 is managed using the connection device management table. The connection device management table manages the SSID of an AP to which an external device is connected, and the MAC address of the external device in association with each other, as shown in FIG. 3. The association request has a structure shown in FIG. 4A. In the embodiment, a MAC address serving as the "source address" is used as device identifier information for management, and "Service Set ID (SSID)" is used as AP identifier information. In the embodiment, the digital camera 100 is assumed to operate simultaneously as APs having two types of SSIDs "MY_SSID" and "GUEST_SSID", as shown in FIG. 3. In the practice of the present invention, however, the number of APs as which the digital camera 100 can operate simultaneously is not limited to two.

In step S205, the control unit 101 establishes wireless connection, transmits, to the external device serving as the request transmitting source, an association response representing that the connection has succeeded, and then terminates the connection device management processing.

In step S206, the control unit 101 determines whether the message received by the wireless communication unit 106 is a disassociation request serving as a wireless connection disconnection request from an external device which is being wirelessly connected. If the control unit 101 determines that the received message is the disassociation request, it shifts the process to step S207. If the control unit 101 determines that the received message is another message, it terminates the connection device management processing.

In step S207, the control unit 101 refers to device identifier information of the request transmitting source contained in the received disassociation request, deletes information associated with the device identifier information from the connection device management table, and then terminates the connection device management processing. The control unit 101 refers to, for example, the "source address" field of the disassociation request and can acquire information for specifying the external device serving as the request transmitting source. Hence, the connection device management table managed in the digital camera 100 according to the embodiment can manage only an external device currently in wireless communication and connection with the digital camera 100, together with identifier information of the connection destination AP.

Providing Function Limitation Processing

Figure 5:
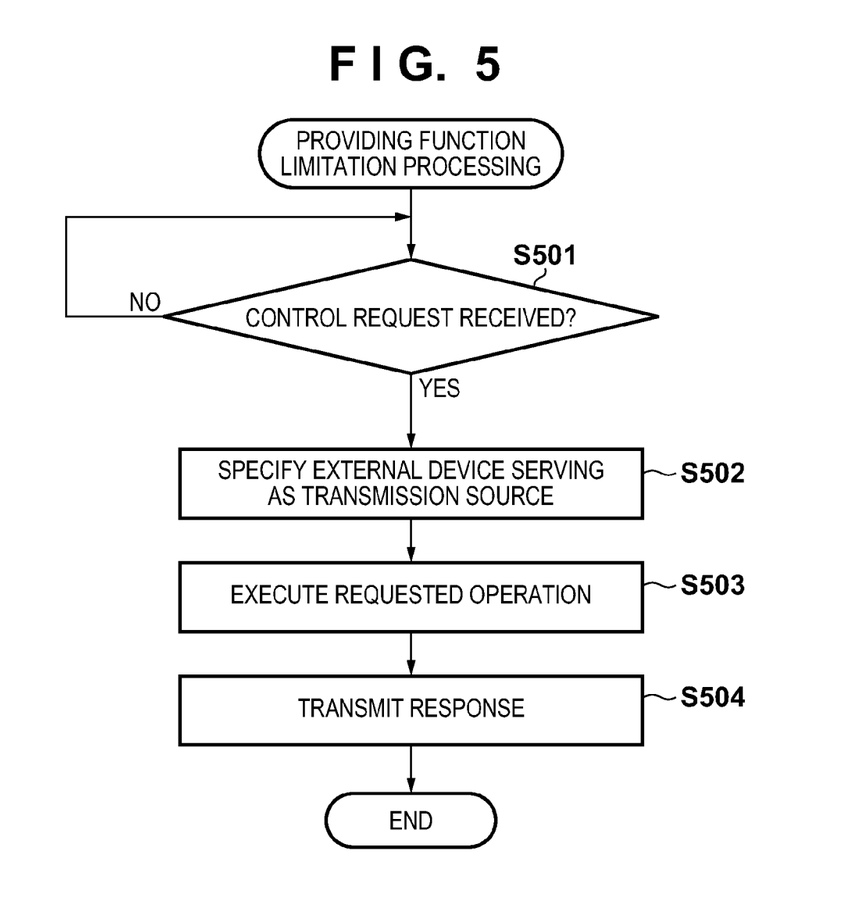
FIG. 5 is a flowchart exemplifying providing function limitation processing to be executed by the digital camera 100 according to the embodiment of the present invention.

Next, providing function limitation processing which is executed by the digital camera 100 according to the embodiment to limit, for each device, functions to be provided to an external device to be wirelessly connected will be explained in detail with reference to the flowchart of FIG. 5. The digital camera 100 according to the embodiment provides, as functions controllable from an external device, at least one of a capturing operation, browsing and editing of a captured image, and setting change of the digital camera 100. The embodiment will explain that the digital camera 100 provides the above-described four functions to be controllable from an external device. In the practice of the present invention, however, functions to be provided to an external device are not limited to them.

Processing corresponding to this flowchart can be implemented by reading out a corresponding processing program stored in, for example, the ROM, loading it to the RAM, and executing it by the control unit 101. In the following description, the providing function limitation processing starts when the digital camera 100 is activated as a predetermined AP and generates a plurality of networks.

In step S501, the control unit 101 determines whether the wireless communication unit 106 has received a control request for the functions of the digital camera 100 from an external device. If the control unit 101 determines that the control request has been received, it shifts the process to step S502. If the control unit 101 determines that the control request has not been received, it repeats the processing of this step.

Figure 4B:
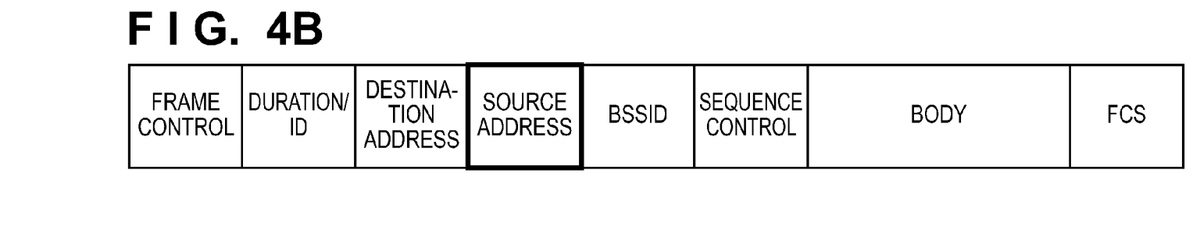

In step S502, the control unit 101 refers to device identifier information which is contained in the control request and specifies the external device serving as the request transmitting source, and specifies an AP to which the external device serving as the request transmitting source is wirelessly connected. More specifically, the control request has, for example, a structure shown in FIG. 4B. By referring to the "source address" field contained in the control request, first, the control unit 101 acquires device identifier information of the external device serving as the request transmitting source. Then, the control unit 101 refers to the SSID of information associated with the device identifier information in the connection device management table, and specifies an AP to which the external device serving as the request transmitting source is wirelessly connected. For example, when the connection device management table is one as shown in FIG. 3, if the "source address" is "00:11: 22:33:44:55", it is specified that the external device serving as the request transmitting source is connected to "MY_S-SID".

In step S503, the control unit 101 determines whether a control-requested function permits external control at the AP to which the external device serving as the request transmitting source is wirelessly connected. The control unit 101 executes processing corresponding to the determination result. More specifically, first, the control unit 101 looks up a providing function management table stored in, for example, the ROM and specifies a function which permits external control at the AP to which the external device serving as the request transmitting source is wirelessly connected. If the control-requested function permits external control, the control unit 101 operates the function in accordance with the control request.

Figure 6:
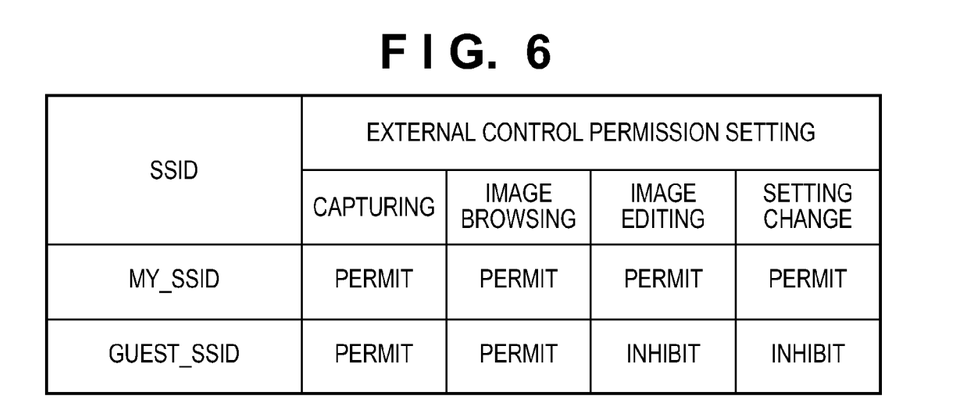
FIG. 6 is a table exemplifying a providing function management table used in the providing function limitation processing according to the embodiment of the present invention.

The providing function management table has, for example, a structure as shown in FIG. 6 and defines, for each AP, whether to permit or inhibit external control of each function. In the example of FIG. 6, external control of all the above-mentioned four functions is permitted for an external device which is wirelessly connected to an AP having an identification name "MY_SSID". In contrast, external control of only the capturing operation and image browsing is permitted for an external device which is wirelessly connected to an AP having an identification name "GUEST_SSID". For example, if it is configured to connect the mobile phone of the owner of the digital camera 100 to an AP having the identification name "MY_SSID" and connect the mobile phone of a user other than the owner to an AP having the identification name "GUEST_SSID", functions to be provided can be easily divided. Note that the providing function management table may be editable by a user operation so that the correspondence between an AP and a function, control of which is permitted, can be changed by a user operation.

As for an AP which does not limit externally controllable functions, like the AP having the identification name "MY_SSID", when the digital camera 100 operates as such an AP, the AP may be set in the stealth mode so that only the owner who knows the presence of this AP can access the AP. That is, the control unit 101 controls the wireless communication unit 106 not to send a beacon signal for causing an external device to detect the AP, so that a mobile phone cannot detect this AP by beacon search. At this time, since the owner knows the SSID of this AP, he can connect his mobile phone to this AP by manually designating the SSID of this AP.

To the contrary, as for an AP which limits externally controllable functions, that is, provides only some functions to be externally controllable, it suffices not to set the AP in the stealth mode and to permit the mobile phone of even a user who is not the owner to access the AP. That is, the control unit 101 controls to send a signal which enables an external device to detect this AP. Therefore, even a user who is not the owner can search APs, detect a function-limited AP, and wirelessly connect his mobile phone to the AP.

Note that the practice of the present invention is not limited to this, and other modifications can be made. For example, password authentication may be required for connection to an AP which does not limit externally controllable functions, and may be omitted for connection to an AP which limits externally controllable functions. For example, as for an AP which does not limit externally controllable functions, MAC address filtering may be set to register in advance the MAC address of the mobile phone of the owner and reject other addresses so that only the mobile phone of the owner can be connected.

Figure 7A:
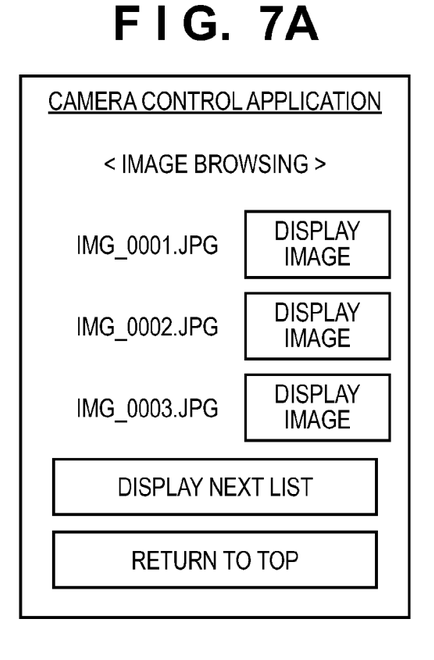
FIGS. 7A, 7B, 7C, and 7D are views showing examples of a screen displayed on a mobile display unit 202 of the mobile phone 200 in the providing function limitation processing according to the embodiment of the present invention.

In step S504, the control unit 101 transmits, as a response to the external device serving as the request transmitting source, the result of executing processing corresponding to the determination in step S503, and then end the processing. For example, when the control request is a request to acquire a list of images regarding image browsing, information necessary to display a GUI screen as shown in FIG. 7A on the mobile display unit 202 of the mobile phone 200 is transmitted as a response.

Figure 7B:
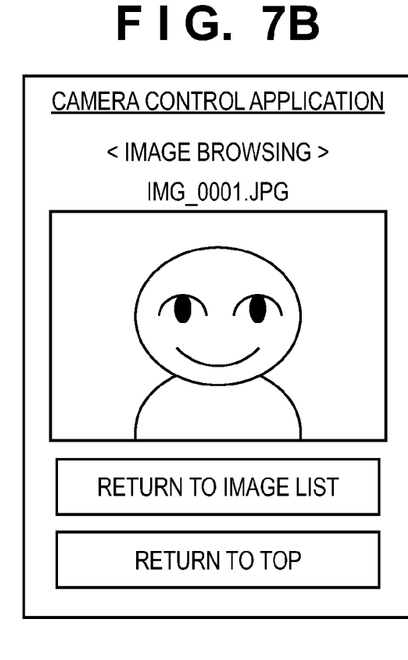

For example, when the control request is a request to display an image selected from the list regarding image browsing, image data and the like necessary to display a GUI screen as shown in FIG. 7B on the mobile display unit 202 are transmitted as a response. If a control-requested function is a function which is inhibited at an AP to which an external device serving as a request transmitting source is connected, information to display, on the mobile display unit 202, a notification that execution of this function is inhibited may be transmitted as a response.

As the response method, for example, it is conceivable to notify the items of permitted functions. Also, when a digital camera functions as a Web server, as in the embodiment, a page representing a GUI screen corresponding to a permitted function may be prepared in the digital camera 100, and the address of a page corresponding to a partner may be notified.

Figure 7C:
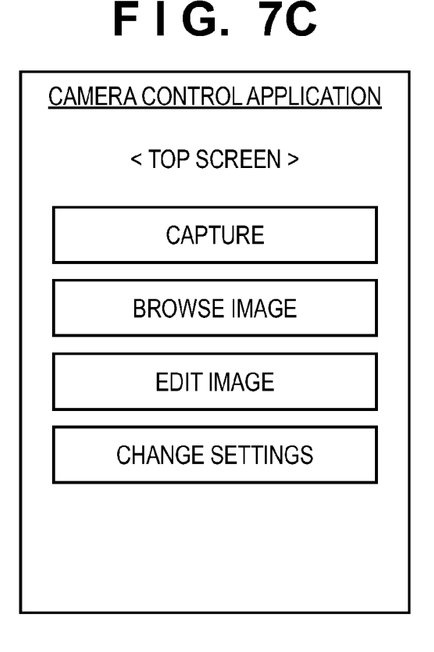
Figure 7D:
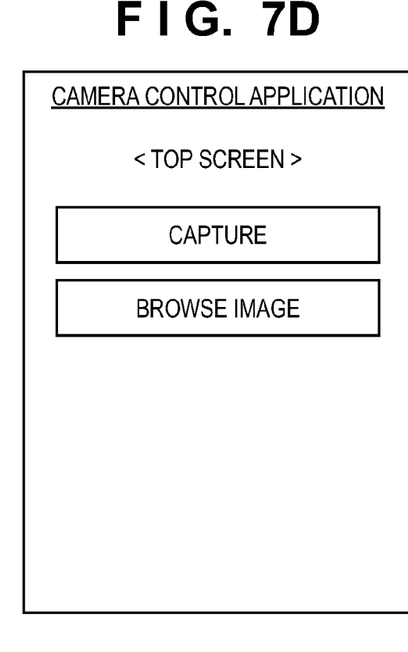

In the embodiment, a corresponding operation is executed when external control of a control-requested function is permitted, and is not executed when it is inhibited. However, the practice of the present invention is not limited to this. For example, when the mobile phone 200 is wirelessly connected to the digital camera 100, the mobile control unit 201 may control the mobile wireless communication unit 203 to transmit a request to acquire a list of externally controllable functions in the digital camera 100 in accordance with a client program to be executed in the mobile phone 200. Upon receiving the acquisition request, the control unit 101 may look up the providing function management table and transmit information to display, on the mobile display unit 202, only functions, external control of which is permitted for an AP to which the mobile phone 200 serving as the request transmitting source is connected. It is therefore possible to present, on the mobile display unit 202, a GUI screen as shown in FIG. 7C for an AP which does not limit externally controllable functions, and a GUI screen as shown in FIG. 7D for an AP which limits externally controllable functions, so that each function can be selected. Since externally uncontrollable functions are not provided in advance, a simple, user-friendly GUI can be provided to the user of an external device.

In terms of security, the control unit 101 may control the wireless communication unit 106 to fix an identification name for an AP accessible by only the owner and change an identification name in every generation for an AP which temporarily permits control of some functions.

Also, in terms of security, a wireless communication network regarding an AP accessible by only the owner and a wireless communication network regarding an AP accessible by a user who is not the owner may be generated at different timings. More specifically, a wireless communication network to which only the owner can connect a device may be generated when the wireless communication function of the digital camera 100 is enabled. Also, a wireless communication network to which a user who is not the owner can connect a device may be generated only when the wireless communication function is enabled and the owner performs an operation input to start generation of the network.

As described above, the communication apparatus according to the embodiment can easily set functions to be provided to an external device. More specifically, the communication apparatus generates the first wireless communication network and transmits/receives information via the first wireless communication network. Further, the communication apparatus generates the second wireless communication network different from the first access point and transmits/receives information via the second wireless communication network. The communication apparatus controls to change functions available by using a predetermined application in accordance with the first or second wireless network via which an external device establishing communication is connected.

With this arrangement, the functions of the communication apparatus that can be provided to an external device can be set separately for the respective access points of a plurality of wireless communication networks generated parallelly. That is, functions which can be provided can be easily changed without making preliminary settings in an external device or setting functions limited for each external device.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-007843, filed Jan. 18, 2013, which is hereby incorporated by reference herein in its entirety.

What is claimed is:

1. A communication apparatus capable of operating as a multi-access point, comprising:
a processor performing the functions of a first communication unit, a second communication unit, a determination unit and a control unit, wherein
the first communication unit is configured to generate a first wireless network by operating as a first access point and transmit/receive information via the first wireless network;
the second communication unit is configured to generate a second wireless network different from the first wireless network by operating as a second access point and transmit/receive information via the second wireless network;
the determination unit is configured to determine one of the first wireless network and the second wireless network via which an external device establishing communication with the communication apparatus is connected; and
the control unit is configured to control to allow the external device to use a function or functions of the communication apparatus using a predetermined application on the external device,
wherein said control unit controls to provide, in accordance with a result of determination by said determination unit, at least one available function using the predetermined application when the external device is connected via the first wireless network that is not the same as at least one available function using the predetermined application when the external device is connected via the second wireless network.

2. The apparatus according to claim 1, wherein the communication apparatus can operate as a generator of the second wireless network while operating as a generator of the first wireless network.

3. The apparatus according to claim 1, further comprising an image capturing unit,
wherein the function using the predetermined application includes at least one of capturing by said image capturing means, browsing of an image captured by said image capturing unit, editing of an image obtained by said image capturing unit, and setting change of the communication apparatus.

4. The apparatus according to claim 1, wherein
in a case where said determination unit determines that the external device is connected via the first wireless network, said control unit controls to permit the external device to use predetermined functions, and
in a case where said determination unit determines that the external device is connected via the second wireless network, said control unit controls to permit the external device to use at least one function smaller in number than the predetermined functions.

5. The apparatus according to claim 4, wherein in a case where said determination unit determines that the external device is connected via the second wireless network, said control unit controls to limit some of the predetermined functions.

6. The apparatus according to claim 5, wherein
the predetermined functions include at least a function of changing a setting of the communication apparatus, and
in a case where said determination unit determines that the external device is connected via the second wireless network, said control unit limits the function of changing a setting of the communication apparatus.

7. The apparatus according to claim 5, wherein
the predetermined functions include at least a function of browsing an image held by the communication apparatus, and
in a case where said determination unit determines that the external device is connected via the second wireless network, said control unit does not limit the function of browsing an image held by the communication apparatus.

8. The apparatus according to claim 1, wherein the first wireless network requires password authentication for connection, and the second wireless network does not require password authentication for connection.

9. The apparatus according to claim 1, wherein an ID of the first wireless network is permanent, and an ID of the second wireless network is changed every time the second wireless network is generated.

10. The apparatus according to claim 1, wherein the communication apparatus generates the first wireless network and the second wireless network as access points.

11. The apparatus according to claim 9, wherein
said first communication unit does not transmit a signal which allows an external device to detect an access point, and
said second communication unit transmits a signal which allows an external device to detect an access point regarding the second wireless network.

12. The apparatus according to claim 1, wherein generation of the first wireless network by said first communication unit and generation of the second wireless network by said second communication unit are performed at different timings.

13. The apparatus according to claim 12, wherein
said first communication unit generates the first wireless network in a case where an operation to enable a wireless communication function is performed, and
said second communication unit generates the second wireless network in a case where an operation to start generation of the second wireless network is performed.

14. The apparatus according to claim 1, further comprising a transmission unit configured to, in a case where one of said first communication unit and said second communication unit receives a control request for a function provided to the connected external device, transmit a response corresponding to an operation of the function to the external device which has transmitted the control request.

15. The apparatus according to claim 1, wherein the communication apparatus is an image capturing apparatus.

16. A method of controlling a communication apparatus capable of operating as a multi-access point,
the communication apparatus including a processor performing the functions of a first communication unit and a second communication unit, wherein the first communication unit is configured to generate a first wireless network by operating as a first access point and transmit/receive information via the first wireless network, and the second communication unit is configured to generate a second wireless network different from the first wireless network by operating as a second access point and transmit/receive information via the second wireless network, the control method comprising:
determining one of the first wireless network and the second wireless network via which an external device establishing communication with the communication apparatus is connected; and
controlling to allow the external device to use a function or functions of the communication apparatus using a predetermined application on the external device,
wherein the controlling is performed to provide, in accordance with a result of the determination, at least one available function using the predetermined application when the external device is connected via the first wireless network that is not the same as at least one available function using the predetermined application when the external device is connected via the second wireless network.

17. A non-transitory computer-readable recording medium recoding a program for causing a computer to function as each unit of a communication apparatus capable of operating as a multi-access point, said communication apparatus comprising:
a processor performing the functions of a first communication unit, a second communication unit, a determination unit and a control unit, wherein
the first communication unit is configured to generate a first wireless network by operating as a first access point and transmit/receive information via the first wireless network;
the second communication unit is configured to generate a second wireless network different from the first wireless network by operating as a second access point and transmit/receive information via the second wireless network;
the determination unit is configured to determine one of the first wireless network and the second wireless network via which an external device establishing communication with the communication apparatus is connected; and
the control unit is configured to control to allow the external device to use a function or functions of the communication apparatus using a predetermined application on the external device,
wherein said control unit controls to provide, in accordance with a result of determination by said determination unit, at least one available function using the predetermined application when the external device is connected via the first wireless network that is not the same as at least one available function using the predetermined application when the external device is connected via the second wireless network.

* * * * *